United States Patent [19]

Privee et al.

[11] 3,749,532

[45] July 31, 1973

[54] INTERNAL SEAL FOR ROTARY ENGINE

[76] Inventors: Ralph A. Privee, 746 N. 19th Ave., Hollywood, Fla. 33020; Ronald E. Wilchynski, 25 Greenhill Ln., Cheshire, Conn. 06410

[22] Filed: Sept. 27, 1971

[21] Appl. No.: 183,828

[52] U.S. Cl............ 418/137, 418/142, 418/146, 418/148, 418/262
[51] Int. Cl.... F01c 19/00, F04c 15/00, F04c 27/00
[58] Field of Search.................. 418/136, 137, 142, 418/145–147, 262, 148

[56] References Cited
UNITED STATES PATENTS

| | | | |
|---|---|---|---|
| 2,345,561 | 4/1944 | Allen | 418/137 |
| 3,485,179 | 12/1969 | Dawes | 418/146 |
| 2,382,259 | 8/1945 | Rohr | 418/146 |
| 1,354,281 | 9/1920 | Carroll | 418/146 |
| 3,215,128 | 11/1965 | Poulson | 418/146 |

FOREIGN PATENTS OR APPLICATIONS

| | | | |
|---|---|---|---|
| 6,388 | 1914 | Great Britain | 418/142 |

Primary Examiner—Carlton R. Croyle
Assistant Examiner—John J. Vrablik
Attorney—Walter Spruegel

[57] ABSTRACT

In a rotary engine with an internal casing chamber, and an operating rotor unit therein having a rotary carrier with guideways for operating vanes which move in follower relation with the peripheral chamber wall and, together with the carrier, divide the chamber into successive compartments, an internal seal comprising an end sealing strip and opposite side sealing strips in each vane spring-urged into sealing contact with the adjacent chamber walls, with the side sealing strips on each vane extending within the longitudinal confines of its guideway, opposite transverse sealing strips in each guideway spring-urged into sealing contact with the confronting halves of the vane therein and with the side sealing strips in the latter, and further sealing strips in the opposite sides of the carrier spring-urged into sealing contact with the adjacent sidewalls of the chamber and being in sealing continuity with the other sealing strips in blocking all leakage paths between the compartments.

2 Claims, 6 Drawing Figures

INVENTORS
Ralph A. Privee
Ronald E. Wilchynski

ATTORNEY

Patented July 31, 1973  3,749,532
2 Sheets-Sheet 2
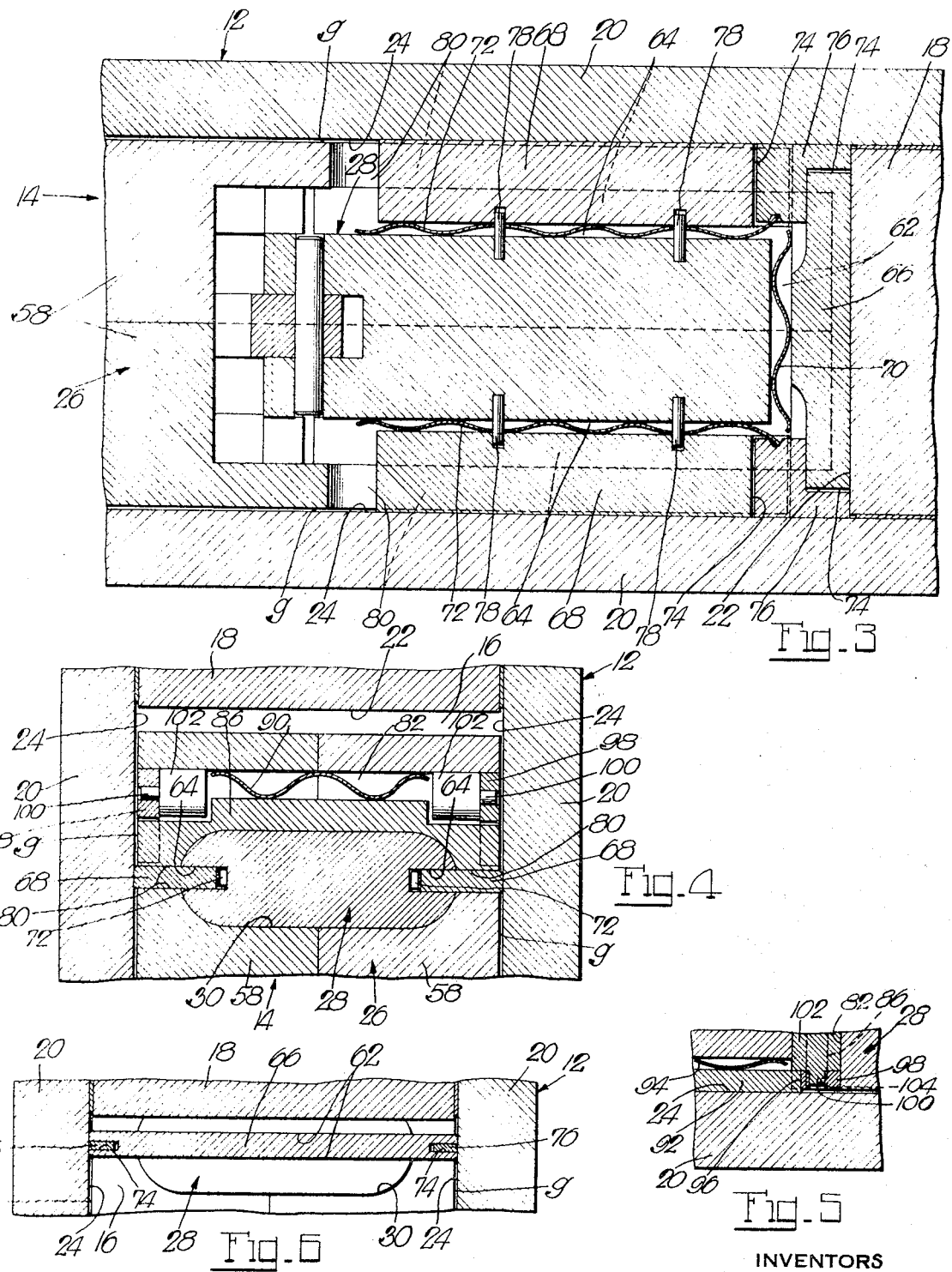
INVENTORS
Ralph A. Privee
Ronald E. Wilchynski
ATTORNEY

INTERNAL SEAL FOR ROTARY ENGINE

This invention relates to rotary engines in general, and to internal seals for rotary engines in particular.

In conventional engines of rotary type, an operating rotor unit, including moving vanes, in an engine casing divide the interior chamber in the casing into the usual intake, compression, combustion and exhaust compartments, and internal seals serve to hold the gasses in the several compartments at their respective operational pressure and prevent their leakage into other compartments. While such engines are, by virtue of their rotary performance, advantageous over conventional engines of reciprocating type in important operational and also structural respects, they are not nearly as easily sealed as engines of reciprocating type due to the imperative multi-functions of their rotor units in operation which inherently makes for potentially quite extensive leakage paths between the compartments that internal seals are called upon to block. Such internal engine sealing is necessarily quite extensive, in that it must encompass the rotor unit, including moving vanes, at every point of exposure to each compartment in order to be at all effective, which leaves internal sealing a formidable and major task in any event in constructing reliable engines of rotary type.

It is among the important objects of the present invention to provide for engines of rotary type internal seals formed by parts that are arranged in a pattern of effective mutual sealing cooperation and fully encompass the areas of the rotor unit, including moving vanes, which are exposed, but in fairly close proximity, to the effective operating volumes of the individual casing compartments in order to confine seal-off of the latter as closely as possible to their operating volumes. With this arrangement, the individual casing compartments are effectively sealed very close to where leakage paths from other compartments would reach their operating volumes, whereby highly desirable extensive and most effective lubrication of the rotor unit, including moving vanes, may also be achieved.

It is another object of the present invention internally to seal engines of rotary type by the aforementioned parts that lend themselves to efficient and low-cost mass production and from which to pick parts at random for their assembly in individual engines, with the actual sealing parts being metal strips of a few different outlines that may conveniently be blanked from sheet stock, and the assembly of these parts in individual engines being a simple task, involving mostly their mere insertion into machined seats in appropriate engine components, with the inserted parts including simple springs for loading the sealing strips for their reliable and long-lasting sealing function.

It is another object of the present invention internally to seal engines of rotary type by the aforementioned parts, of which the assembled parts in an individual engine are carried in toto by the operating rotor unit and constitute a complete seal, thereby not only to permit machining into this unit of the seats for the parts and assembly of the parts with the unit, as well as ready inspection and even testing of the complete seal, advantageously before the unit is assembled with the engine casing and, hence, is readily accessible for these tasks, but also permitting assembly with the casing of the rotor unit with the complete seal intact, by simply sliding this unit axially into the casing chamber through an open side to-be-closed by a cover plate, which further affords ready indication, by observation and feel, of the performance of the complete seal in the final engine assembly.

It is a further object of the present invention internally to seal engines of rotary type by the aforementioned parts all of which, including the sealing strips, are carried by the rotor unit, and more particularly by the operating vanes and the rotary carrier which supports and guides the vanes for their operational movement, in the aforementioned manner of fully encompassing the areas of the rotor unit which are exposed, but in fairly close proximity, to the effective operating volumes of the individual casing compartments. This is achieved by seating in the outer end and both sides of each vane spring-loaded sealing strips of overlapping sealing function at their junctions, with the end strip being in sealing contact with the peripheral wall of the casing chamber, and the side strips being in sealing contact with the opposite sidewalls of this chamber to within the longitudinal extent of the guideway in the carrier for the respective vane, seating in the carrier near the outer end of each guideway for the vane a set of opposed transverse spring-loaded sealing strips which extend with their ends into substantial sealing contact with the opposite chamber sidewalls and are laterally in sealing contact with the confronting faces of the vane and the side sealing strips thereat, to thereby block any leakage paths from the casing compartments into the interior of the rotor unit, and seating in the opposite faces of the vane carrier near its outer circumference sealing strips which are spring-urged into sealing contact with the adjacent chamber sidewalls, and extend between the side sealing strips in successive vanes to cooperate with the latter in blocking any leakage paths from either casing compartment to the others via the narrow clearance gaps between the opposite faces of the vane carrier and adjacent sidewalls of the casing chamber.

Further objects and advantages will appear to those skilled in the art from the following, considered in conjunction with the accompanying drawings.

In the accompanying drawings, in which certain modes of carrying out the present invention are shown for illustrative purposes:

FIGS. 3 to 6 are enlarged fragmentary sections taken on the lines 3—3 to 6—6, respectively, of FIG. 1.

Figure 1:
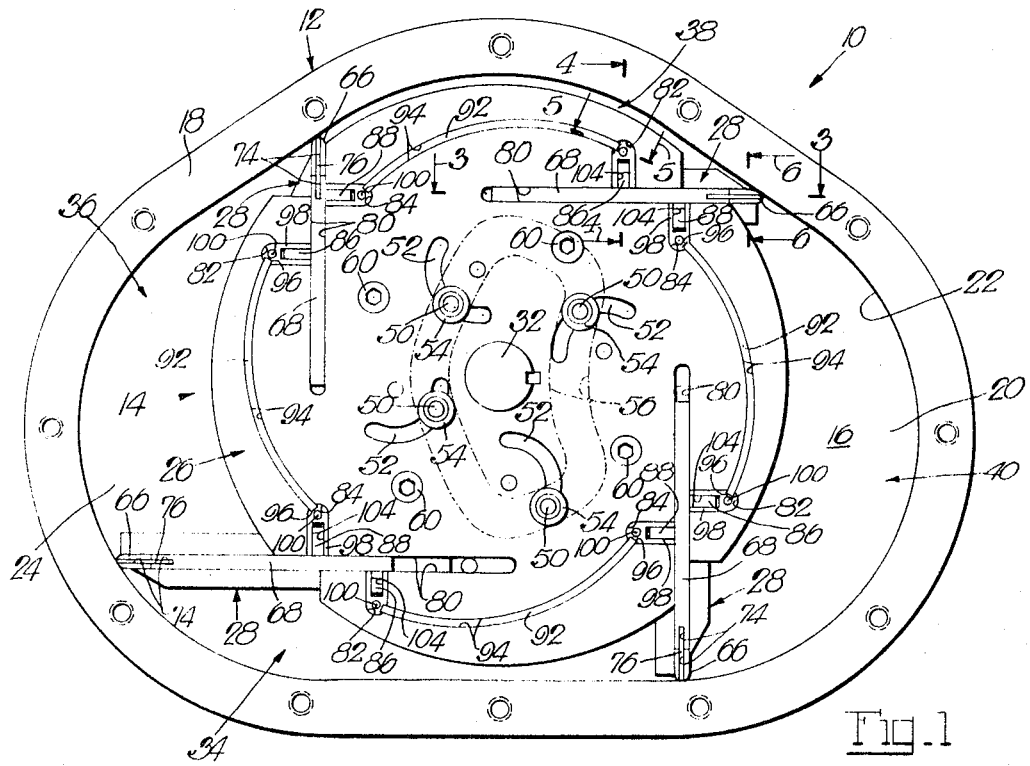
FIG. 1 is a side view of a rotary engine with an internal seal according to the invention, with a side cover being removed for full view of the operating rotor unit of the engine.
Figure 2:
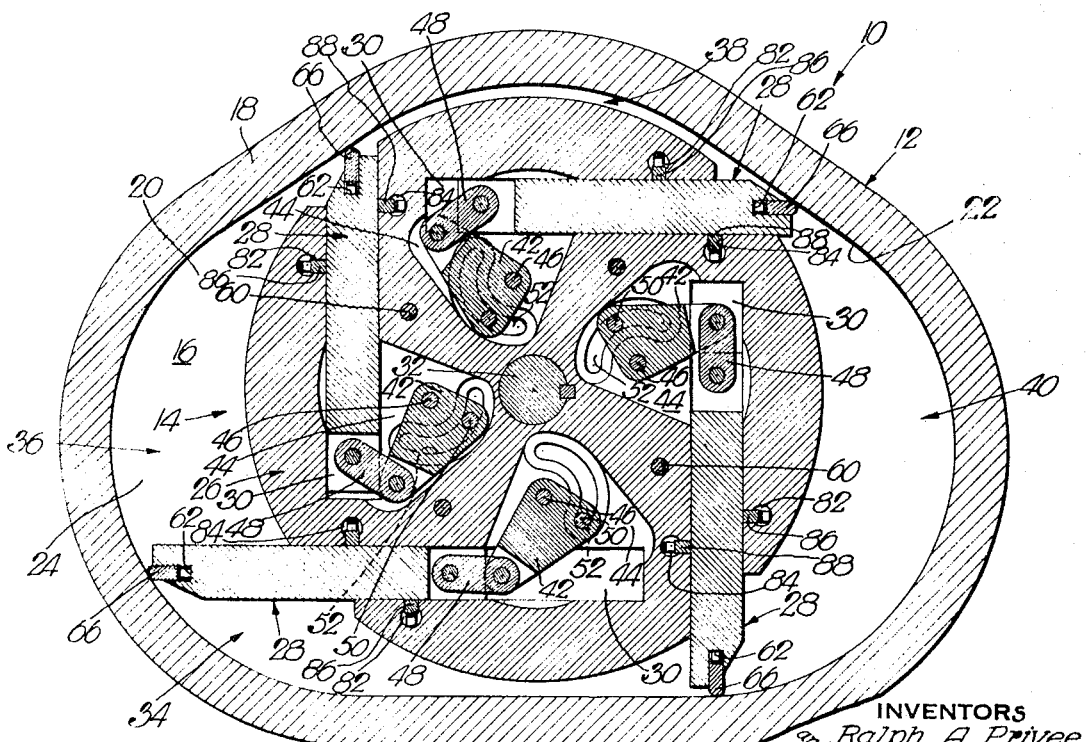
FIG. 2 is a section through the rotary engine of FIG. 1.

Referring to the drawings, and more particularly to FIGS. 1 and 2 thereof, the reference numeral 10 designates a rotary engine having a casing 12 and an operating rotor unit 14. The casing provides an internal chamber 16, and is formed by an open casing section 18 and opposite cover sections 20, of which the open casing section 18 provides the peripheral wall 22 of the chamber 16, and the cover sections 20 provide the opposite sidewalls 24 of this chamber (see also FIG. 3).

The operating rotor unit 14 provides a rotary carrier 26 and a plurality of operating vanes 28 which are supported and guided in ways 30 in the carrier for movement in follower relation with the peripheral chamber wall 22. The carrier 26 is keyed to a shaft 32 which is suitably journalled in the cover sections 20 of the casing 12. The carrier and vane components 26, 28 of the rotor unit divide the casing chamber 16 into cyclically successive intake, compression, combustion and exhaust compartments 34 to 40, with these compartments being shown in FIGS. 1 and 2 at their respective volumes at the moment of firing a charge in the combustion compartment 38 with a sparkplug (not shown) and ensuing drive of the rotor unit in clockwise direction. The casing 12 is also provided with intake and exhaust ports and interposed camcontrolled valves (neither shown).

For moving the vanes 28 in follower relation with the peripheral chamber wall 22 on the drive of the rotor unit 14, there are provided camoperated rockers 42 which are operatively linked with the respective vanes. The rockers 42 are located in recesses 44 in the vane carrier 26 and pivoted to the latter as at 46, and they are connected with the respective vanes 28 by links 48. The rockers 42 also carry pins 50 which extend through arcuate slots 52 in the opposite faces of the carrier 26, and carry rollers 54 in follower engagement with identical cam grooves in the opposite sidewalls 24 of the chamber 16, with one of these cam grooves 56 being shown in dot-and-dash lines in FIG. 1. For internal machining of the carrier 26, including its guideways 30, as well as for assembly of the rockers 42, links 48 and vanes 28 with the carrier 26, the latter is formed of companion sections 58 (FIG. 3 and 4) which are bolted together as at 60 (FIGS. 1 and 2).

For internally sealing the engine against leakage of gasses and pressures between the several compartments 34 to 40, recourse is had to relatively simple parts, with the actual sealing elements being metal strips of which most or all of them may conveniently be blanked from sheet stock. To seal the compartments 34 to 40 against leakage past the associated vanes 28, each of the latter is in its outer end and opposite sides provided with an end seat 62 and side seats 64 in the preferred form of machined grooves of rectangular section, which are continuous with each other at their junctions (FIGS. 3, 4 and 6). Received with a slide fit in the end groove 62 and side grooves 64 in each vane are an end sealing strip 66 and side sealing strips 68 which are preferably spring-loaded as at 70 and 72 to be urged into most effective sealing contact with the respective chamber walls 22 and 24 (FIGS. 3 and 4). The end and side sealing strips 66 and 68 are at their junctions in overlap sealing relation, which is achieved in preferred manner by providing adjacent endlengths of these strips with aligned slots 74 and inserting therein L-shaped corner strips 76, with the latter being by the adjacent ends of the springs 72 urged into sealing contact with the chamber walls thereat (FIGS. 1 and 3 to 6). To avoid longitudinal displacement of the side sealing strips 68 in operation of the engine and, hence, interruption of the continuous seal along the outer end and opposite sides of the vane, these sealing strips 68 are at 78 pinned to the vane with freedom to respond to their loading springs 72 (FIG. 3). The side sealing strips 68 extend longitudinally for some distance into the vane carrier 26 (FIG. 1), wherefore the latter is provided with clearance slots 80 (see also FIGS. 3 and 4). The end, side and corner sealing strips 66, 68 and 76 in the vanes 28 thus block leakage paths between the several compartments 34 to 40 over their respective operating volumes and via the narrow clearance gaps g between the opposite sides of the vane carrier 26 and adjacent sidewalls 24 of the chamber 16 over the extent of the side sealing strips 68 into these gaps (FIGS. 1 and 3).

To block leakage paths between each of the compartments 34 to 40 and the interior of the vane carrier 26, and thereby avoid carbon deposits therein and their interference with effective lubrication of the moving parts therein, including the vanes, sealing strips are also provided in the guideways 30 for the vanes. Thus, provided in each guideway 30 in the carrier 26 are opposite transverse seats 82 and 84 in the preferred form of machined grooves of partly-rectangular and partly-cylindrical section (FIGS. 2 and 4). Received with a sliding fit in these transverse seats 82 and 84 are transverse sealing strips 86 and 88 which by springs 90 are urged into form-fitting sealing contact with the confronting halves of the respective vanes and side sealing strips 68 in the latter, in the manner shown in FIG. 4 for one of the transverse sealing strips 86. Each of these transverse sealing strips 86 and 88 extends longitudinally into close promixity to the opposite sidewalls 24 of the chamber 16 (FIG. 4), and the transverse sealing strips 86, 88 in each guideway 30 are provided fairly near the outer end of the latter (FIG. 2) to afford effective lubrication of the respective vane over a considerable longitudinal extent of the guideway.

It has already been mentioned that leakage paths between the several compartments 34 to 40, via the clearance gaps g between the opposite sides of the vane carrier 26 and adjacent sidewalls 24 of the chamber 16, are blocked by the side sealing strips 68 in the vanes over the extent of these strips into the gaps g. In order to block all remaining leakage paths between the compartments 34 to 40 via these gaps g, there are provided further sealing strips 92 on the opposite sides of the vane carrier 26. These sealing strips 92 are also spring-loaded, and are seated in grooves 94 in the opposite sides of the vane carrier (FIGS. 1 and 5), with these grooves 94 being in this instance of curved extent, and each extending longitudinally from one transverse groove 82 in a guideway 30 to the nearest transverse groove 84 in the next adjacent guideway 30 (FIG. 1). The sealing strips 92 are with their ends also seated in notches 96 which are provided in straps 98 in the adjacent ends of the transverse grooves 82 and 84 (FIGS. 1 and 5), with these straps 98 being at 100 pivoted to plug inserts 102 in the part-cylindrical formations of the transverse grooves 82 and 84 (FIGS. 1 and 5). These straps 98 are also slotted at 104 to receive the adjacent ends of the transverse sealing strips 86 and 88. The sealing strips 96 thus have sealing continuity with the side sealing strips 68 in the vanes 28 via the straps 98 (FIG. 1). The seating grooves 94 in the opposite faces of the vane carrier 26 are preferably part-circular in their longitudinal extent not only to receive sealing strips 92 which may be cut from circular ring stock, if desired, but also extend the sealing strips 92 therein throughout their longitudinal extent into fairly close proximity to the exemplary cylindrical periphery of the vane carrier 26. Thus, the effective sealing strips 68, 86, 88 and 92 on each side of the vane carrier 26 which together have endless sealing continuity (FIG. 1) encompass a quite substantial central area of each carrier side within which lubricant may be admitted for effectively lubricating the operating vanes 28 in their guideways 30, with lubricant being forced to circulate, through suitable bores and ports (neither shown) in the shaft 32 and vane carrier 26, into and from the interior of the vane carrier for effective lubrication of all moving parts therein as well as for adequate cooling of the rotor unit 14.

What is claimed is:

1. In a rotary engine, having a casing with a peripheral wall and opposite sidewalls together forming an internal chamber; a rotor unit in said chamber providing a carrier rotary about an axis and having a peripheral surface and spaced from said peripheral casing wall, and opposite side surfaces adjacent to said sidewalls of the casing, and a plurality of longitudinal vanes each having opposite ends and being of oblong cross-section with opposite flat parallel faces and substantially semi-circular sides tangentially merging with said flat faces, with each vane having a median plane parallel to and midway between said faces, said carrier having in its peripheral surface peripherally spaced guide apertures for said vanes, respectively, of which each aperture is of the same cross-section as its associated vane and supports and guides the latter for longitudinal movement with one end thereof in follower relation with said peripheral casing wall and with its median plane extending parallel to said rotary axis and said carrier and vanes dividing said chamber into successive compartments; and sealing means between said compartments, including longitudinal side grooves in each vane and therewith aligned slots in said carrier, of which each side groove and aligned slot has a median plane lying in the median plane of the respective vane, spring-loaded side sealing strips received with a slide fit in said grooves and aligned slots and being in sealing contact with the adjacent sidewalls of the casing, pairs of opposite transverse grooves in said carrier extending from one side surface to the opposite side surface thereof, of which the grooves of each pair are on opposite sides of the median plane of a vane and open to the respective guide aperture and slots in the carrier, and spring-loaded transverse sealing strips received with a slide fit in the transverse grooves of each pair and having inner edges shaped to form-fit, and being in formfitting sealing contact with, the adjacent faces and sides of the respective vane and therefrom projecting side sealing strips.

2. In a rotary engine as in claim 1, said carrier is formed of two companion sections secured to each other and having a parting plane normal to said rotary axis and intersecting said faces of said vanes.

* * * * *